United States Patent [19]

Strauch

[11] 4,392,565

[45] Jul. 12, 1983

[54] HOLDING DEVICE FOR A HOLLOW BODY WITH AN OPEN END AND A PIVOTAL HANDLE FOR PRINTING THEREON IN A PRINTING MACHINE

[75] Inventor: Karl Strauch, Kirchlengern, Fed. Rep. of Germany

[73] Assignee: Werner Kammann Maschinenfabrik GmbH, Bunde, Fed. Rep. of Germany

[21] Appl. No.: 296,503

[22] Filed: Aug. 26, 1981

[30] Foreign Application Priority Data

Sep. 8, 1980 [DE] Fed. Rep. of Germany ....... 3033736

[51] Int. Cl.[3] ............ B65G 17/32

[52] U.S. Cl. ............ 198/378; 101/38 A; 118/503; 279/3

[58] Field of Search ............ 198/378, 344; 414/744 R, 744 A; 101/38 R, 38 A; 118/503, 230, 319, 426; 279/3

[56] References Cited

U.S. PATENT DOCUMENTS 2,245,425 6/1941 Aungst ............ 118/503

*Primary Examiner*—Jeffrey V. Nase
*Assistant Examiner*—Dennis J. Williams
*Attorney, Agent, or Firm*—Howson and Howson

[57] ABSTRACT

A holding device for holding an open-end hollow body with a pivotal carrying handle includes a mounting member for mounting the hollow body. Disposed at one end of the mounting member is an annular support member carrying a locking member. The support member serves as an abutment to define a given position for the pivotal handle, such as not to impede access to the hollow body for the printing mechanism. The locking member is movable relative to the mounting member between an operative position of securing the handle in its given position, and an inoperative position in which the handle is free to pivot into and out of its given position.

22 Claims, 3 Drawing Figures

HOLDING DEVICE FOR A HOLLOW BODY WITH AN OPEN END AND A PIVOTAL HANDLE FOR PRINTING THEREON IN A PRINTING MACHINE

BACKGROUND OF THE INVENTION

There is often a need for printing on a hollow member or body which is open at one end and which has a carrying handle, generally of an arcuate loop configuration, mounted pivotally thereon. A typical example of such a hollow member is a bucket or pail, or other container such as for containing paint or similar liquids. It will be observed at this point that the apex region of the handle (to be defined in greater detail hereinafter) experiences a change in its distance from the longitudinal axis of the hollow member on which it is mounted, in the course of its pivotal movement about its pivot mounting on the hollow member. The term apex region as used in the specification means the region of the handle which is generally at the maximum distance from the points at which the handle is mounted on the hollow member, so that in the case of an arcuate handle, the apex region is the top of the arcuate curve. Thus, the term apex region is the part of the handle which is used for carrying the hollow member by means of the handle and which may possibly have a handle grip or like member mounted thereon for greater convenience of carrying.

When printing on hollow members of this kind, it is generally necessary for the carrying loop or handle to be fixed in order to prevent the handle from moving in an uncontrollable fashion during the printing operation and/or impeding access to the surface on which the printing is to be put. Thus, when such members are to be provided with printing in a rotary printing machine, the hollow members may be mounted on holding devices which are provided at appropriate positions with magnets with which the handle of the hollow member is brought into contact when the member if fitted on to the holding device, with the result that the handle is secured in a given position by the magnet. It will be appreciated however that this is only a feasible proposition if the hollow member or the like has a metal handle. This means that this arrangement cannot be used for handles of non-magnetisable material, for example plastic material. A further disadvantage is that, when the hollow member is removed from the holding device after the printing operation has been performed, the magnet may hold the handle fast, with the result that the equipment does not operate smoothly and continuously and without trouble, because the hollow member, once printed upon, cannot drop down freely from the holding device into the station at which it is to be removed for further processing.

It would be possible for the above-indicated difficulties and problems to be overcome by fitting the handle to the hollow member only after the printing operation has been carried out. This however is generally found to be a disadvantageous mode of procedure as it is easier for the handle to be fitted to a bucket or the like, which generally comprises thermoplastic material, directly after manufacture thereof. This is essentially because, directly after the bucket or like member leaves for example an injection moulding machine, it is still at a relatively elevated temperature at which the parts thereof which need to be deformed in order to be able to fit the handle thereto can be deformed more readily than is the case even only hours or even days after the bucket has been produced.

SUMMARY OF THE INVENTION

An object of the invention is to provide a device for holding a hollow body to be printed upon, which has a handle, such as to overcome the above-indicated disadvantages.

A further object of the present invention is to provide a holding device for an article such as a bucket having a pivotal handle, such that the handle can be secured in a predetermined position such as not to impede the printing operation.

A still further object of the present invention is to provide a holding device for holding a bucket or like container having a handle, for a printing operation on the bucket, which is simple and reliable in structure and operation.

Yet another object of the invention is to provide a holding device for a bucket or like container, adapted to retain the handle thereof in a given position irrespective of the material of either the container and/or the handle.

These and other objects are achieved by an arrangement in accordance with the present invention, comprising a support shaft carrying a rotary mounting member for mounting a bucket or like hollow body thereon. At its end which is towards the shaft, the mounting member is provided with at least one locking member which is movable with respect to the mounting member and which is capable of assuming an operative locking position in which it engages the apex region of the handle of the bucket or like body, from either the inside or the outside thereof. The locking member is adapted to be moved from its locking position into an inoperative position in which it is disposed outside or away from the arcuate path of movement that would be described by said handle apex region in the course of its pivotal movement of the handle when the bucket is mounted on the mounting member. Associated with the mounting member and rotatable therewith is a support member such as an annular disc or plate which carries the locking member and which is adapted to act as an abutment for supporting the apex region of the handle, when the locking member is in its inoperative position, thereby to align the handle apex region relative to the locking member so that the locking member engages the handle when moving into its operative locking position.

It will be appreciated that, when reference is made herein to the apex region of the handle, this is also intended to include constructions in which the handle is provided with a separate handle grip or other like member in the apex region. Generally, as indicated above, the term apex region denotes the region of the handle, irrespective of its actual geometrical shape, being the part of the handle which is at the greatest distance from the axis about which the handle is pivoted to the hollow body.

The holding device in accordance with the present invention operatives in such a manner that, in its operative locking position, the locking member is disposed blockingly in the path of movement of the handle as described by the apex region thereof in the course of a pivotal movement towards the free end of the mounting member, namely the end remote from the end at which the mounting member is connected to the support shaft. In the opposite direction, that is to say, in the direction of pivotal movement towards the end of the mounting member at which it is connected to the support shaft, the annular member serves as an abutment which at the same time aligns the handle with respect to the locking member so that, as the locking member moves into its operative position, it engages behind or over the handle apex region. The handle apex region may come to bear against the locking member so as to be locked thereby, either at an inward surface or an outward surface, this essentially depending on whether the handle-contacting surface of the locking member is at a greater or smaller distance from the axis of rotation of the rotary mounting member, than the apex region of the handle.

In one embodiment of a holding device in accordance with this invention, the annular member which carries the locking member and which is disposed around the support drive shaft of the rotary mounting member is connected to the mounting member by way of interposed spring means which urge the locking member towards the operative locking position thereof. This means that, as long as the annular member is not subjected to a force which would cause a change in the position thereof, the spring means hold the annular member in its operative locking position. The spring means are desirably in the form of a plurality of coil springs.

The locking member may comprise a flange-like projection disposed on the annular support member, for example around the periphery thereof, being mounted on the side of the annular member which faces towards the free end of the mounting member. The support member may be displaceable between its operative locking position and its inoperative position, in a direction substantially transverse with respect to the axis of the support shaft of the mounting member. Alternatively, the annular support member may be so arranged that at least a part of its periphery is adpated to be displaced from its operative locking position in which it bears against the mounting member or a projection portion thereof, into a position in which it is spaced from said mounting member or said projection portion; thus, assuming that the forces causing such movement of the support member engage the support member only at a limited region or point thereon, the annular member will move into an inclined position relative to the axis of the support shaft and the mounting member, so that, as the mounting member and therewith the support member are rotated by the support shaft, the support member and therewith also the locking member will perform a wobble movement. By virtue of that wobble movement, the apex portion of the handle will be capable of engaging behind or under the locking member carried by the support member, then being held in position when the support member moves, in the course of its wobble motion, out of the position in which the apex region of the handle is capable of engaging behind the locking member.

In an embodiment of the present invention, the holding device may comprise a turret head or rotary assembly comprising a plurality of the above-mentioned support shafts, each having a mounting member carried at a free end thereof. The mounting members are rotated in a vertical plane, that is to say, about a horizontal axis, passing in succession through a plurality of stations at which various operations or treatments are to be carried out with or on the hollow body on a mounting member. Actuating means for actuating the locking member or the above-mentioned support member, thereby to move the locking member between its operative locking position and its inoperative position, may desirably be associated with that station at which the open end of the hollow body on which printing is to be produced faces downwardly. This has the result that, when the hollow body is placed in a mounting member in that station, the handle will pivot downwardly, under the influence of its own weight, until initially it comes to bear against the support member or part of the locking member, without however being locked in position. The locking member is then displaced to permit the handle to move into a position in which it can be engaged by the locking member. Thus, the locking member will hold the handle in position, and will therefore prevent pivotal movement of the handle towards the free end of the hollow body or bucket.

Movement of the support member and therewith also the locking member from the operative locking position into an inoperative position in which the handle can take up a position in which it can be engaged by the locking member when the locking member returns to its operative locking position, can be produced by cam roller means which engage the support member, for example at or adjacent to the peripheral region thereof.

It will be seen hereinafter that the device according to the invention is of a simple and open structure so that the piece of equipment in which it is used is not made more complicated or expensive to any significant degree, as a result.

It will be appreciated that there is generally no need for a special release mechanism for removing the printed hollow body from the mounting member after the printing operation is terminated, as, when the hollow member is axially removed from the mounting member on which it has been printed, the apex region of the handle automatically comes out of engagement with the locking member.

DESCRIPTION OF THE PREFERRED EMBODIMENTS

Reference will now be made to the drawings which show two preferred embodiments of the device embodying the principles of this invention.

Figure 1:
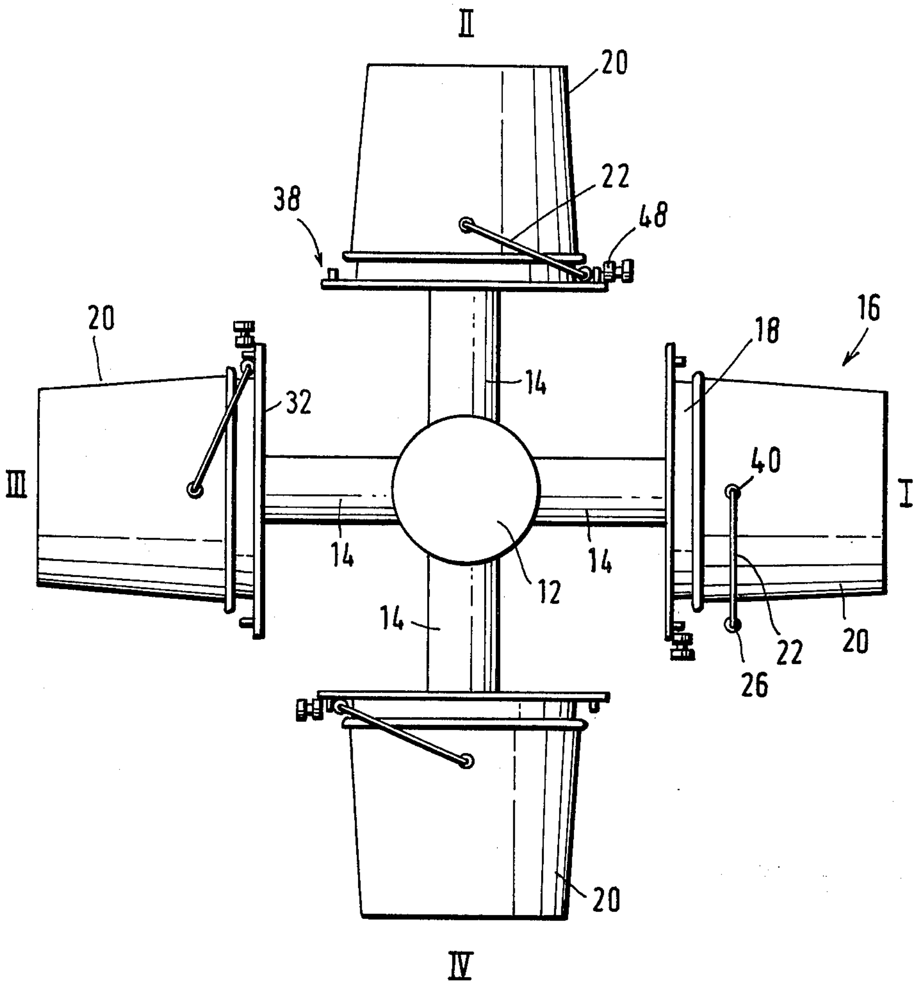
FIG. 1 shows a diagrammatic view of the holding device for an offset printing machine.

Referring therefore firstly to FIG. 1, shown therein is a holding device which substantially comprises a turret head 12 carrying holders 16 for hollow members 20 to be printed, the holders 16 being mounted by means of support drive shafts 14 operable to produce rotary movement of the holders 16 about the axis of the respective shaft 14. Each holder 16 is provided with a shaped hollow mounting member 18 (see FIG. 2) which is adapted in its external shape to the shape of the hollow member 20 to be printed upon. The hollow member 20 is open at one end, as illustrated in the form of a bucket or pail, and is provided with a loop-like carrying handle 22.

The holders 16 are advanced with a stepwise motion, with each step being an angular motion of 90°, so that the holders 16 pass in succession through stations I, II, III and IV. In station I, a hollow member 20 to be printed is fitted on to the holder 16 disposed at that station, or, more particularly, on the mounting member 18 thereof, the position of the loop or handle 22 being of no importance in this operation. In the subsequent stepping movement of the head 12 through 90°, the holder 16 with the hollow member 20 disposed thereon is moved from station I to station II in which the longitudinal axis of the hollow member 20 extends vertically and the handle 22 which is mounted on the hollow member 20 pivotally in the usual manner performs a pivotal movement in a downward direction until its apex region 24, or a handle grip 26 mounted on the carrying handle at that region, comes into abutment against a flange-like projection 38 on an annular disc or plate 32 which, in its normal position, is arranged coaxially with respect to the shaft 14 of the respective holder 16, at the end of the holder which is towards the shaft 14. The plate 32 is held by coil springs 34 which are loaded in a tension mode, in a normal or rest position in which it bears against an end surface 36 of the mounting member 18. In general, four spring means as at 34 which are distributed around the periphery of the assembly are sufficient to hold the annular plate 32 in its normal position in which it is braced against the end surface 36 of the holder 16, over the entire periphery of the plate 32.

The flange-like projection 38 is formed integrally on the plate 32, at the side thereof which is towards the mounting member 18. When the plate 32 is in its above-defined normal position, the projection 38 extends coaxially with respect to the shaft 14 or the axis of rotation thereof. The axial extent of the flange-like projection 38 at least approximately corresponds to the diameter of the handle grip 26 mounted on the handle 22.

Figure 2:
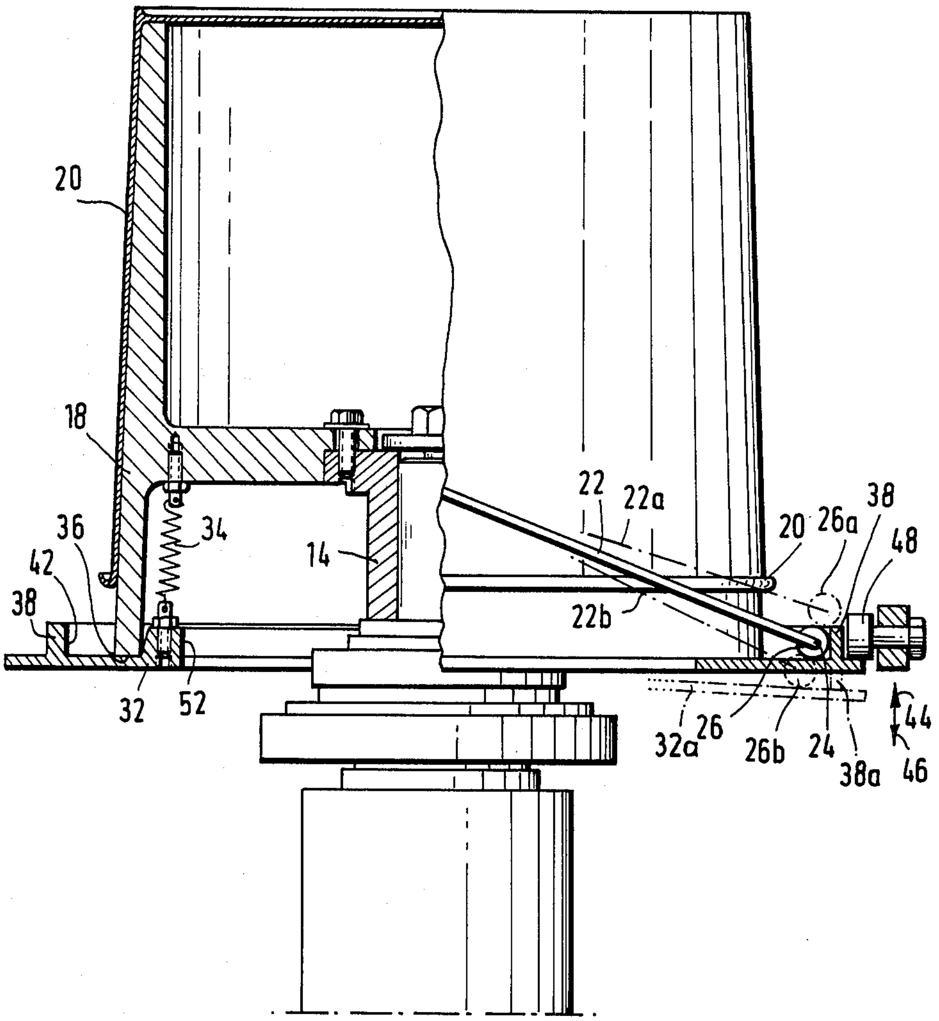
FIG. 2 shows an elevational view, partly in section, of an individual holder on an enlarged scale.

Reference will now be made also to FIG. 2 which shows the positions of the carrying loop or handle 22 and the handle grip 26 at the end of the above-mentioned, downwardly directed pivotal movement thereof, those positions being shown in broken lines and denoted by reference numerals **22*a* and 26*a* respectively. This view shows that the radial dimension of the loop or handle 22, including the handle grip 26, with respect to the pivot 40 (see FIG. 1) thereof on the hollow member 20, is somewhat larger than the distance of the inwardly facing peripheral surface 42 of the projection 38 from the axis of rotation of the shaft 14 so that, when the handle grip 26 is in the position indicated at 26*a*, it firstly bears on the upwardly facing end surface of the projection 38**.

In station II, operatively associated with the plate 32 is a cam roller 48 which can be displaced with a back and forth motion in the directions indicated by arrows 44 and 46 in FIG. 2, i.e. upwards and downwards in FIG. 2. In its limit position at the end of its movement in the direction indicated by the arrow 46, the roller 48 pivots the plate 32 against the force of the spring means 34 into the position shown in dash-dotted lines in the drawings at **32*a*, whereby the plate 32, at least in part, takes up an inclined position and is moved away from the end surface 36 of the member 18, over the major part of its periphery. As a result, under the operating effect of the roller 48, the plate 32 thus performs a pivotal movement about a point which lies opposite the roller 48 on the mounting member 18. As the holder 16 is rotated at the same time about the longitudinal axis of the shaft 14, the above-described pivotal movement of the plate 32 into the position shown at 32*a*, by the roller 48, consequently produces a wobble motion of the plate 32 so that in the course of one revolution, each region of the periphery of the annular plate 32 is moved once into the position shown at 32*a*. In the respective region of the plate 32 which is in the position shown at 32*a*, the projection 38 is also in a corresponding position as shown at 38*a* in FIG. 2. It will thus be seen from FIG. 2 that, when the projection 38 is in that position, the projection 38 is no longer within the range of pivotal movement of the handle grip 26, so that the handle 22 with the handle grip 26 thereon is moved pivotally further downwardly into the positions shown at 22*b* and 26*b* respectively, under the effect of the weight of the handle and handle grip, until the handle comes to bear against the annular plate 32, radially inwardly of the projection 38. As soon as the roller 48 is moved back into its starting position, by an upward movement in the direction indicated by the arrow 44 in FIG. 2, which can take place after at least one revolution of the annular plate 32 while in position 32*a*, the plate 32 is also moved back under the force of the tension springs 34 into its starting position in which it bears against the end surface 36 of the mounting member 18, over the entire periphery thereof. In the course of the upward movement of the plate 32, from the position shown in broken line at 32*a* into the normal position shown in solid line, the radial distance between the handle grip 26 and the radially inwardly facing peripheral surface 42 of the projection 38 is reduced to such an extent that the handle grip 26 is retained in its position, radially inwardly of the projection 38, by that projection. This is because, if the handle 22 were to attempt to pivot towards the starting position 22*a*, the handle grip 26 would have to be moved increasingly outwardly; however such movement of the handle grip 26 is blocked and prevented by the radially inwardly facing peripheral surface 42 of the projection 38, which extends axially from the annular plate 32 for a sufficient distance for that purpose. Therefore, the blocking position of the projection 38 and the annular plate 32** thus corresponds to the above-mentioned normal position of those components.

After the handle 22 has been secured in position in the above-described manner, the holder 16 is pivoted from station II to station III in which the printing operation is performed thereon. Upon further pivotal movement of the head 12, the holder 16 with the hollow member 20 carried thereon goes from station III to station IV in which the bucket or like hollow member can be pulled off in a downward direction. In that operation, at the same time the handle or loop 22 is pivoted in such a way that the handle grip 26 comes out of engagement with the projection 38. There is therefore no need for special steps to be taken in station IV, to liberate the handle grip.

At its radially inward edge, the annular plate or disc 32 is provided with projections 52 which serve to mount screw members by means of which the springs 34 are connected to the annular plate 32. At the same time, the projections 52 serve to centre the annular plate 32 in the mounting member 18 which is open at that end.

Figure 3:
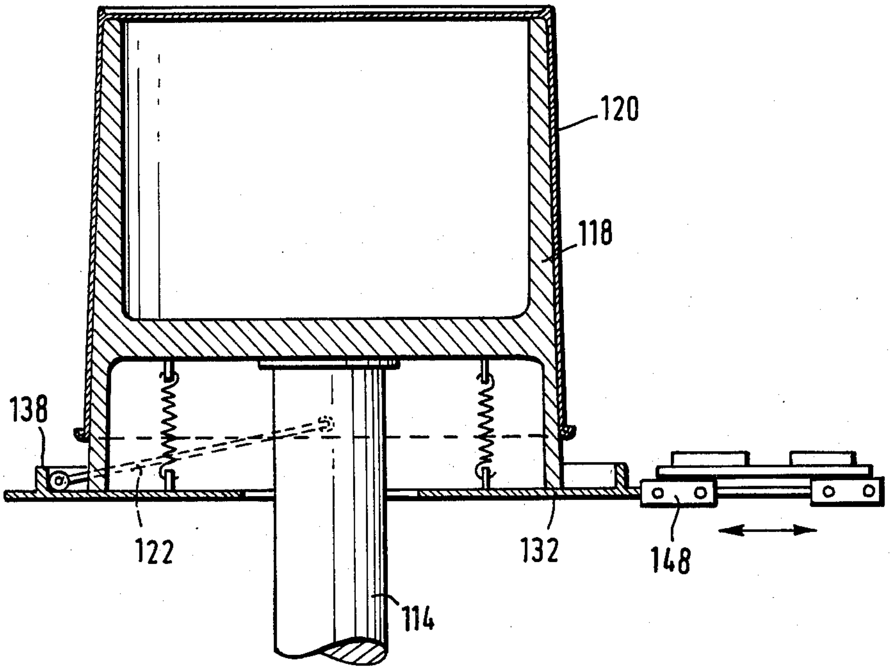
FIG. 3 shows a view, corresponding to FIG. 2, of a second embodiment of the holding device.

Reference will now be made to FIG. 3 which shows another form of the arrangement embodying the principles of this invention and in which components corresponding to components shown in FIGS. 1 and 2, or performing the same functions as those components, are denoted by the same reference numeral but increased by 100; thus, the shaft 14 of FIGS. 1 and 2 becomes the shaft 114 in FIG. 3. Looking now therefore at FIG. 3, it will be seen that the general configuration of the device and the holder is generally the same as described above, but that the annular plate 132 is displaced substantially transversely with respect to the shaft 114, that is to say, in its main plane, in order thereby to move the flange-like projection 138 into a position in which the apex region of the carrying loop or handle 122 or a handle grip mounted thereon in that region can pivot until it comes to bear against the plate 132, inwardly of the projection 138. The plate 132 with the projection 138 thereon is then also moved back to its initial position, transversely with respect to the shaft 114. In this case, it is not possible for the annular plate 132 to be centered with respect to the mounting member 118.

It will be noted that, in regard to the embodiment shown in FIG. 3, when the carrying handle 122 and a handle grip provided thereon, if any, are in their initial position, being the position corresponding to the positions shown at *22a* and *26a* respectively in FIG. 2, the carrying loop and the handle grip do not necessarily lie against the upwardly facing end surface of the projection, but on the contrary can come to bear against the annular plate 132. The only important point to consider here is that, by virtue of the transverse movement into the normal or locking position of the annular plate 132, the projection 138 is moved into a position in which it engages behind the carrying handle 122 or handle grip, in the above-described manner, thereby to hold the handle in the position illustrated in FIG. 3.

It should be noted in regard to both embodiments illustrated that the projection 38 or 138 respectively may comprise a plurality of projections which are arranged on a circular configuration, although the spacing between each two projections must be sufficiently small to produce the above-mentioned effect of locking the handle in place.

Various modifications may be made in the above-described embodiments of this invention without thereby departing from the spirit and scope thereof.

What is claimed is:

1. A holding device for a hollow body which is open at a first end and which is provided with a handle mounted pivotally thereon, to be printed upon in a rotary printing machine, the handle having an apex region which in the course of pivotal movement about its mounting on the hollow body experiences a change in its distance from the axis of the hollow body, the holding device comprising at least one shaft and a rotatable mounting member carried by the shaft, for holding a said hollow body, wherein at an end which is towards the shaft, the mounting member is provided with at least one locking member which is movable with respect to said hollow body carried by the mounting member and which is adapted to be brought into engagement with said apex region of the handle, thereby defining an operative locking position, and wherein the locking member is adapted to be moved from its locking position into another position in which it lies out of the arcuate path of movement described by the said apex region in the course of pivotal movement of the handle, and wherein a support member is arranged to rotate with the mounting member and carries the locking member and in the operative position of the locking member serves as an abutment for said apex region and aligns same relative to the locking member.

2. A device as set forth in claim 1 wherein said locking member is adapted to said apex region at a side thereof which is towards said mounting member.

3. A device as set forth in claim 1 wherein said locking member has a surface facing inwardly towards said shaft and adapted to engage said apex region when the locking member is in its operative locking position.

4. A device as set forth in claim 1 wherein said support member carrying said locking member extends around the drive shaft of said mounting member and is connected to said mounting member by way of spring means, said spring means being adapted to urge said support member and said locking member towards the operative locking position thereof.

5. A device as set forth in claim 4 wherein said spring means comprises a plurality of coil springs.

6. A device as set forth in claim 1 wherein said locking member comprises a flange portion on said support member.

7. A device as set forth in claim 6 wherein said flange portion extends peripherally around said support member.

8. A device as set forth in claim 6 wherein said locking member comprises a plurality of projection portions on said support member.

9. A device as set forth in claim 1 wherein said support member is adapted to be displaced substantially transversely with respect to said shaft of said mounting member between its said operative locking position and an inoperative position.

10. A device as set forth in claim 1 wherein at least a part of the periphery of said support member is movable between a first position in which it bears against said mounting member and in which said locking member is in its operative position and a second position in which said at least part of said periphery is spaced from said mounting member.

11. A device as set forth in claim 1 and comprising a plurality of stations adapted to receive said mounting member in succession, wherein actuating means for displacing said locking member between its operative and inoperative positions are associated with a said station in which said open end of said hollow body faces downwardly.

12. A device as set forth in claim 1 wherein the movement of said locking member from its said operative locking position into its inoperative position is produced by a roller means.

13. A device as set forth in claim 12 wherein said roller means is operative to engage said support member at the periphery thereof.

14. A device as set forth in claim 12 wherein said roller means is operative to engage said support member adjacent to the periphery of said support member.

15. A holding device for holding a hollow body which is open at a first end and which has pivotally mounted thereon a handle defining an apex region, for printing on said hollow body in a printing machine, said holding device comprising:

a support shaft, a rotary mounting member carried by the support shaft and adapted to mount a said hollow body, said mounting member having a first end at which there is provided at least one locking means which is movable with respect to the mounting member between an operative locking position in which said locking means is adapted to engage the apex region of a said handle and an inoperative position in which said locking means is disposed away from the arcuate path of movement of said apex region in the course of pivotal movement of said handle, and a support means which is adapted to rotate with said mounting member and which carries said locking means, whereby, in said operative locking position of said locking means, said support means serves as an abutment for said apex region and aligns same with respect to said locking means.

16. A device as set forth in claim 15 wherein said locking means is displaceable between its operative and inoperative positions by a pivotal movement.

17. A device as set forth in claim 15 wherein said locking means is displaceable between its operative and inoperative positions by a substantially linear movement.

18. A device as set forth in claim 17 wherein said locking means is displaceable between its operative and inoperative positions by a sliding movement transversely with respect to the axis of said support shaft.

19. A device as set forth in claim 15 wherein said locking means is carried by an annular plate, and further including roller means operative to pivot said annular plate between a first position in which said locking means is in its said operative position and a second position in which said locking means is in its said inoperative position.

20. A device as set forth in claim 19 and further including spring means adapted to urge said annular plate towards said first position said roller means being operable to displace said annular plate towards said second position.

21. A device as set forth in claim 15 wherein said locking means comprised at least one projection on said annular plate.

22. A holding device for holding a plurality of hollow bodies which are each open at a first end and which are each provided with a handle having an apex region and pivotally mounted thereon, for successive printing thereon in a rotary printing machine, said holding device including:

a rotary assembly comprising a plurality of support shafts;

each said support shaft carrying a respective mounting member adapted to carry a respective hollow body to be printed upon;

an annular plate associated with a first end of said mounting member which is towards the respectively associated support shaft and which is adapted to serve as an abutment for the apex region of the handle of a said hollow body carried on said mounting member;

a locking member for locking the handle of a said hollow body carried on said mounting member in a given position such as not to impede operation of the printing mechanism, said locking member being displaceable between an operable locking position in which it is adapted to securingly engage the apex region of said handle and an inoperative position in which it is inoperative to secure said handle; and means for displacing said locking means between its operative and inoperative positions.

* * * * *